United States Patent [19]

May et al.

[11] 4,151,235

[45] Apr. 24, 1979

[54] PRODUCTION OF BETA-ALUMINA

[75] Inventors: Geoffrey J. May, Frodsham; Stephen R. Tan, Runcorn, both of England

[73] Assignee: Chloride Silent Power Limited, London, England

[21] Appl. No.: 822,015

[22] Filed: Aug. 4, 1977

[30] Foreign Application Priority Data

Aug. 16, 1976 [GB] United Kingdom ............... 34004/76

[51] Int. Cl.² ............................................. C04B 35/10
[52] U.S. Cl. .................... 264/13; 106/73.4; 264/61; 264/66; 264/346; 429/193
[58] Field of Search .................. 264/13, 56, 61, 66, 264/346; 429/193; 106/73.4

[56] References Cited

U.S. PATENT DOCUMENTS

| 3,895,963 | 7/1975 | McGowan et al. | 429/193 |
| 3,903,225 | 9/1975 | Jones et al. | 264/65 |
| 3,959,022 | 5/1976 | DeJonghe et al. | 264/66 |

OTHER PUBLICATIONS

Virkar et al., "Hot Pressing of $Li_2O$-Stabilized $\beta''$-Alumina", J. Am. Civ. Soc., 57[11], p. 508, 1974.
Youngblood et al., "Sintering Process and Heat Treatment Schedules for Conductive, Lithio-Stabilized $\beta''$-$Al_2O_3$", Civ. Bull. 56[2], pp. 206–212 (1977).
Jones et al., "Production of $\beta$-$Al_2O_3$ Electrolyte", Proc. Brit. Cir. Soc., No. 19, pp. 161–178 (1971).
Kingley, Ceramic Fabrication Processes, pp. 65–66 (1958).
Hoffman, "Importance of Binders in Spray Dried Bodies," Cir. Bull., pp. 240–242, vol. 5, #3 (1972).

Primary Examiner—Robert F. White
Assistant Examiner—John A. Parrish
Attorney, Agent, or Firm—Beveridge, DeGrandi, Kline & Lunsford

[57] ABSTRACT

A method of producing a beta-alumina ceramic article containing a doping addition of magnesium oxide or of magnesium oxide and lithium oxide, comprising the steps of wet-milling a precursor material or emulsification of an already powdered precursor material to form an aqueous slurry, spray-drying the slurry to produce a powder, forming the powder into a green shape and sintering the shape, wherein the precursor material contains at least some of the magnesium oxide in the form of magnesium aluminate.

13 Claims, No Drawings

4,151,235

PRODUCTION OF BETA-ALUMINA

BACKGROUND OF THE INVENTION

1. Field of the Invention

This invention relates to the production of beta-alumina.

2. Prior Art

Beta-alumina is a solid oxide ceramic, which conducts sodium ions and has a negligible electronic conductivity. It has a composition by weight of 5 to 10% sodium oxide, the balance being alpha-alumina with small additions of magnesium oxide and/or lithium oxide, which tend to enhance the ionic conductivity of the beta-alumina. This material is used in a variety of electrical energy and material conversion devices, for example as the electrolyte and separator in a sodium sulphur cell.

Articles of beta-alumina may be produced by sintering shapes formed of powdered material. These shapes may be produced by a number of different production routes. For example, the powder may be formed from the constituent oxides or it may be powdered beta-alumina or it may be a mixture of the constituent oxides and beta-alumina. The green shapes may, for example, be produced by dry vibro-energy milling together of the powdered material, e.g. alpha-alumina, sodium aluminate and magnesia, and then forming a required shape, e.g. a tube, by isostatic pressing. These shapes may then be sintered in a pass-through furnace as described for example, in U.S. Pat. Nos. 3,903,225 and 3,950,463. The use of dry milling as a method of mixing and comminuting the constituent materials is satisfactory from the point of view of producing a high sintered density in the final article, but this powder has relatively poor flow properties. These poor flow properties are quite acceptable in the production of small numbers of articles but, for a high rate of production, such as may be required with automated production techniques, a free-flowing powder with a reproducible particle size distribution is preferable in order to ensure the production of green shapes of uniform density by isostatic pressing. Dry vibro-energy milling is a batch process and, for commercial production of beta-alumina articles, it would also be preferable to have a technique by which free-flowing powders can be made on a continuous basis. The present invention employs a spray drying technique of an aqueous slurry to make a free-flowing powder. Spray drying equipment is commercially available, which can produce powder on a continuous basis at an economic cost. The spray drying process may employ a stable slurry of powder in water or in an aqueous solution of one or more of the other constituents; a fine spray of slurry droplets is produced by atomisation, and these are then dried in a flow of hot gas, usually air. The large surface area of slurry exposed to the hot air results in rapid drying of the droplets to form spherical aggregates. The powder produced by the drying of the droplets may be separated from the air using a cyclone. It has been found readily possible, by spray drying, to produce spherical aggregates of beta-alumina precursor powder having excellent flow properties. Moreover the powder may be made free from second phase impurities and can readily be made with a high degree of chemical homogeneity.

The semi-annual report dated January 1976 of Ford Motor Co. Dearborn, Mich., to RANN Division of Advanced Energy Research and Technology, Washington, D.C. under Contract No. NSF-C805 describes tests to produce beta-alumina articles by a process including spray-drying of the powdered oxide material with a number of organic binders, but the report states that the dried powder produced thereby could not be pressed to form thin-walled tubes.

We have, moreover, found that, if an aqueous slurry is formed of mixed oxide material, for example sodium oxide, aluminium oxide and magnesium oxide, or from powdered beta-alumina containing magnesium oxide, such as have been used heretofore in the production of articles of beta-alumina, the density of the sintered beta-alumina produced from the dried powder is low compared with that produced by the heretofore known techniques employing dry milled powder.

SUMMARY OF THE INVENTION

Rather surprisingly, however, we have found that if the required amount of magnesia is incorporated in an aqueous slurry in the form of magnesium aluminate (spinel), then it is not only possible to produce satisfactory tubes and other shapes, but moreover an improvement is obtained in the sintered density and in the ionic conductivity of the beta-alumina finally produced, compared with articles produced by heretofore known techniques.

Thus, according to the present invention a method of producing a beta-alumina ceramic article containing a doping addition of magnesium oxide, or magnesium oxide and lithium oxide, comprises the steps of wet-milling a precursor material or emulsification of an already powdered precursor material to form a slurry, spray-drying the slurry to produce a powder, forming the powder into a green shape and sintering the shape, and wherein the precursor material contains at least some of the magnesium oxide in the form of magnesium aluminate. Preferably, all the magnesium oxide is in the form of magnesium aluminate. The precursor material may comprise, for example, a mixture of magnesium aluminate together with alpha-alumina and sodium oxide or sodium aluminate or sodium hydroxide. Lithium may be included in the form of lithium oxide or lithium carbonate or lithium hydroxide or as lithium aluminate. The precursor material for beta-alumina material containing doping additions of magnesium oxide and lithium oxide may comprise of a mixed magnesium lithium aluminate together with alpha-alumina and sodium oxide or sodium hydroxide or sodium aluminate.

The proportions of the material are chosen to give the required proportions in the final product. Suitable compositions are given, for example, in the aforementioned U.S. Pat. No. 3,903,225.

The spray-drying may be effected in the known way using a stream of hot gas, e.g. air, into which the slurry or the emulsion is fed and the required powders may be separated from the gas stream, for example, by a cyclone separator. The green shapes may be produced from the powdered material in the known way by isostatic pressing. The shapes may be sintered in the known way in a kiln or a rapid-sintering technique may be used. If a rapid sintering technique is to be employed, the shapes may be pre-fired at a temperature between 500° and 1000° C. for a period between 10 minutes and 10 hours depending on temperature before sintering. Preferably, the pre-firing is carried out between 850° and 950° C. for a period of between 4 and 6 hours. Such rapid sintering may be effected in a pass-through furnace at temperatures between 1550° and 1800° C. at speeds between 10 mm per minute and 100 mm per minute. Preferably, the articles are annealed after sintering at a temperature below the sintering temperature and typically between 1250° C. and 1550° C.

The present invention also includes within its scope beta-alumina produced by the above-described method.

DESCRIPTION OF THE PREFERRED EMBODIMENTS

The following examples of methods of producing beta-alumina shapes are given to show the improvement that results from the use of magnesium aluminate in the production of beta-alumina employing a spray-drying technique. Example 1 is an example of the production of beta-alumina shapes from a dry-milled powder using a known technique. Examples 2, 3 and 4 show results obtained when materials similar to those employed in Example 1 and certain other materials are used in a slurry and spray-drying technique. Examples 5, 6, 7 and 8 illustrate the improvement that results from the use of magnesium aluminate instead of magnesium oxide.

EXAMPLE 1

The composition of the beta-alumina electrolyte was, 7.7 w/o $Na_2O$, 2.0 w/o MgO, balance $Al_2O_3$. The starting materials were sodium aluminate, magnesium oxide and finely ground high activity alumina. Powders of the correct composition were dry milled together in 300 mm diameter rubber lined vibro-energy mills using pure alpha-alumina grinding media. The powders were milled together for 48 hours, sieved through a 75 micron mesh, remilled for 10 hours and then coarsely sieved. Green shapes were then produced by isostatic pressing to form a tube with a closed end using polyurethane tooling and an isostatic pressing pressure of 40,000 p.s.i. The green shapes were pre-fired at 700° C. for 5 hours and then zone sintered in a sloping zone sintering furnace (as described in U.S. Pat. No. 4,059,663 and U.S. Pat. No. 4,070,542) with a peak temperature of 1700° C. at a speed of 50 mm/min. The tubes were then annealed in a conventional kiln at 1300° C. for 10 hours. The sintered density of the tubes produced by this route was 3240 kg/m³ and the ionic conductivity at 300° C. was 12Ω cm.

This is an example of the prior art.

EXAMPLE 2

Beta-alumina electrolyte with essentially the same composition as in Example 1 was made from the same finely ground high activity alpha-alumina and magnesium oxide as in Example 1, but the sodium oxide content was added as sodium hydroxide. In other words, the slurry was comprised of a suspension of alpha-alumina and magnesium oxide in an aqueous solution of sodium hydroxide. The slurry was wet milled in a 300 mm diameter rubber lined vibro-energy mill, which was set to give a low amplitude vibration by setting the eccentric weights 30° apart. The grinding media used were 13 mm diameter, 13 mm long alpha-alumina cylinders so that media wear did not introduce contaminants into the slurry. This slurry was dried in a laboratory sized spray drier using centrifugal atomisation with an atomiser speed of 30,000 r.p.m. The air inlet temperature to the spray drier was 215° C. and the air outlet temperature was 125° C. The powder produced was isostatically pressed to form a tube, pre-fired, sintered and annealed in the same manner as that described in Example 1, but a range of pre-firing temperatures, sintering temperatures and sintering speeds were studied as listed in Table 1 below.

TABLE 1

| Sample | Pre-fire ° C./h | Sintering Temp. ° C. | Sintering Speed. mm/min. | Density (kg/m³) | | |
|---|---|---|---|---|---|---|
| | | | | mean | s.d. | sample size |
| 2A | 700/5 | 1700 | 30–70 | 3065 | 12 | 13 |
| 2B | 700/5 | 1700 | 30–70 | 3085 | 17 | 13 |
| 2C | 700/5 | 1725 | 30–80 | 3120 | 39 | 15 |
| 2D | 700/5 | 1705 | 50 | 3169 | 5 | 21 |
| 2E | 700/5 | 1700 | 30–60 | 3137 | 9 | 18 |
| 2F | 700/5 | 1725 | 30–60 | 3144 | 8 | 25 |
| 2G | 900/5 | 1700 | 45–65 | 3047 | 11 | 18 |

In the second column the two Figures are respectively in ° C. and the duration in hours of the pre-firing.

A slight increase in the sintering temperature to 1725° C., but with other conditions as in Example 1, produced a best density of 3180 kg/m³ and an ionic resistivity of 15 ohm cm at 300° C. This is not an example of the invention, but serves to show that magnesium oxide itself produces a substantially inferior ceramic electrolyte.

EXAMPLE 3

Beta-alumina electrolyte with the same composition as in the foregoing examples was prepared in a similar manner by wet milling and spray drying a slurry of the same finely ground high activity alpha-alumina with appropriate quantities of sodium nitrate and magnesium nitrate in aqueous solution to provide the correct proportions of sodium oxide and magnesium oxide on calcining. The powder was isostatically pressed to form a tube, prefired at 850° C. for 7½ hours and sintered using a zone-sintering technique at 1705° C. with a speed between 35 and 45 mm/min. A sintered density of 3164±5 kg/m³ (sample size=6) was achieved. This is also not an example of the invention, but shows that inferior ceramics are also produced by this route.

EXAMPLE 4

Beta-alumina electrolyte with the same composition as in the foregoing examples was prepared in a similar manner by wet milling and spray drying of beta-alumina powder. The beta-alumina powder was prepared by dry milling alpha-alumina, sodium aluminate and magnesium oxide, calcining this powder to form beta-alumina at 1300° C. for 10h and re-milling. Complete conversion to beta-alumina was ensured by examination of the powder by X-ray diffraction. This powder was isostatically pressed to form tubes, prefired at 700° C. for 7½ hours and sintered using a zone sintering technique at 1710° C., the speed of movement through the furnace being 50 mm/min. A sample of 14 tubes produced under these conditions had a sintered density of 3177±12 kg/m³. This, again, is not an example of the invention, but shows the inferior properties produced by this route.

EXAMPLE 5

Beta-alumina electrolyte with the same composition as in the foregoing examples was produced in a similar manner by wet milling to form an aqueous slurry and spray drying, but the magnesium oxide content was added as magnesium aluminate ($MgAl_2O_4$), and a small adjustment in the aluminium oxide content was made to compensate for this. The magnesium aluminate was made by dry milling together stoichiometric proportions of magnesium oxide and the same alpha-alumina powder used for preparing beta-alumina tubes for 16 hours, calcining the mixture at 1500° C. for 8½ hours, re-milling for 16 hours and finally sieving through a 150 micron mesh. Tubes were prepared by isostatic pressing, and prefired and sintered using a zone sintering technique as detailed in Table 2 below.

TABLE 2

| Sample | Pre-fire °C./h | Sintering Temp. °C. | Sintering Speed. mm/min. | Density (kg/m³) | | |
|---|---|---|---|---|---|---|
| | | | | mean | s.d. | sample size |
| 5A | 800/5 | 1725 | 40 | 3228 | 5 | 6 |
| 5B | 800/5 | 1725 | 50 | 3230 | 3 | 6 |
| 5C | 800/5 | 1725 | 55 | 3225 | 4 | 3 |
| 5D | 800/5 | 1725 | 45 | 3221 | 4 | 3 |
| 5E | 900/5 | 1725 | 40 | 3234 | 1 | 4 |
| 5F | 900/5 | 1725 | 45 | 3231 | 4 | 6 |
| 5G | 900/5 | 1725 | 50 | 3230 | 5 | 4 |
| 5H | 900/5 | 1725 | 55 | 3229 | 5 | 7 |
| 5I | 900/5 | 1725 | 50 | 3219 | 7 | 6 |
| 5J | 900/5 | 1725 | 51 | 3226 | 3 | 6 |
| 5K | 900/5 | 1725 | 48 | 3226 | 3 | 9 |
| 5L | 900/5 | 1725 | 45 | 3226 | 3 | 18 |

A tube from sample 5G with a sintered density of 3230 kg/m³ had an ionic resistivity of 9 ohm cm at 300° C.

This is an example of the invention and shows improvements in sintered density and ionic resistivity are obtained in beta-alumina prepared from spray-dried powder when the magnesium oxide content is added as MgAl$_2$O$_4$ (spinel).

EXAMPLE 6

Beta-alumina electrolyte with the composition 8.6 w/o Na$_2$O, 1.0 w/o MgO, 0.5 w/o Li$_2$O, bal Al$_2$O$_3$ was made by wet milling to form an aqueous slurry and spray drying as in Example 5 with the magnesium oxide added as magnesium aluminate and the lithium oxide added as lithium hydroxide solution. Beta-alumina of this composition is described and claimed in the specification of co-pending United States patent application Ser. No. 820,062, filed July 28, 1977. Tubes were made by isostatic pressing, prefired and sintered using a zone sintering technique as shown in Table 3 below:

TABLE 3

| Sample | Prefire °C./h | Sintering Temp. °C. | Sintering Speed mm/min. | Density (kg/m³) | | |
|---|---|---|---|---|---|---|
| | | | | Mean | s.d. | sample size. |
| 6A | 800/5 | 1705 | 55–65 | 3241 | 4 | 11 |
| 6B | 900/5 | 1705 | 50 | 3228 | 3 | 12 |
| 6C | 900/5 | 1705 | 47 | 3227 | 8 | 36 |
| 6D | 900/5 | 1705 | 45 | 3228 | 4 | 15 |
| 6E | 900/5 | 1705 | 50 | 3236 | 5 | 12 |
| 6F | 900/5 | 1705 | 50 | 3236 | 9 | 18 |

This is a further example of the invention and shows similar high sintered densities are obtained with lithia-containing beta-alumina compositions when magnesium oxide is added as magnesium aluminate.

EXAMPLE 7

Beta-alumina electrolyte tubes with the same composition as in Example 6 were made in the same manner but the lithium oxide was added as lithium aluminate (Li$_2$0.5Al$_2$O$_3$, η-alumina) instead of lithium hydroxide. The lithium aluminate was made in a similar manner to the magnesium aluminate by dry milling appropriate quantities of lithium carbonate and finely ground high activity alpha alumina, calcining this mixture and then re-milling the calcined powder. The lithium aluminate is insoluble in water and is in suspension in the caustic slurry with the alpha-alumina and magnesium aluminate. Tubes were formed by isostatic pressing, prefired and sintered using a zone sintering technique as shown in Table 4 below:

TABLE 4

| Sample | Prefire °C./h | Sintering Temp. °C. | Sintering Speed mm/min. | Density (kg/m³) | | |
|---|---|---|---|---|---|---|
| | | | | Mean | s.d. | Sample size |
| 7A | 900/5 | 1700 | 45 | 3220 | 5 | 5 |
| 7B | 900/5 | 1700 | 48 | 3219 | 10 | 10 |
| 7C | 900/5 | 1700 | 50 | 3219 | 5 | 4 |

This is another example of the invention and shows that high densities are still obtained when lithium aluminate is used as a source of lithia although the use of lithium hydroxide produces slightly higher densities.

EXAMPLE 8

Beta-alumina with the composition 8 w/o Na$_2$O, 2 w/o MgO, bal Al$_2$O$_3$ containing a 10% addition of ground, sintered material with the composition 9 w/o Na$_2$O, 4 w/o MgO, bal Al$_2$O$_3$ was made by two routes. In one route, the magnesium oxide (apart from that added as the ground, sintered material) was added as magnesium aluminate and in another as calcined beta-alumina with the composition, 9 w/o Na$_2$O, 4 w/o MgO, bal Al$_2$O$_3$ as in Example 4. The slurry was wet milled and spray dried, and then the powder was formed into tubular green shapes by isostatic pressing as in previous examples. The material incorporating magnesium aluminate had a sintered density of 3191±3 kg/m³ (sample size=45) when pre-fired at 900° C. for 5 hours and sintered using a zone sintering technique at 1725° C. between 45 and 60 mm/min. The material with beta-alumina as a source of magnesium oxide was pre-fired at 800° C. for 5 hours and sintered using a zone sintering technique at 1705° C. between 30 and 40 mm/min. The sintered density was 3072±13 kg/m³ (sample size=8).

This example shows the superiority of the spinel route for a composition containing a ground, sintered addition that improves the ionic resistivity of the material by promoting the formation of the more conductive β"-phase.

Examples 5 to 8 show the general applicability of the use of magnesium aluminate for the manufacture of magnesia-doped beta-alumina by wet milling and spray drying of aqueous slurries.

It has been found that spray drying from non-aqueous solvents produces poor densities compared with the use of aqueous slurries.

In all the above examples, the sintering was effected using a pass-through furnace which was sloped to cause air convection through the furnace in the direction of movement, as is more fully described and claimed in U.S. Pat. No. 4,059,663 and U.S. Pat. No. 4,070,542. All the tubes in the above examples were closed at one end, had a length after firing of approximately 220 mm, an outside diameter of 22 mm and a wall thickness of 1.7 mm.

We claim:

1. A method of producing a beta-alumina ceramic article from a precursor material containing a doping addition of magnesium oxide or of magnesium oxide and lithium oxide, comprising the steps of spray-drying an aqueous slurry of the precursor material to produce a powder, forming the powder into a green shape and sintering the shape, and wherein the precursor material contains at least some of the magnesium oxide in the form of magnesium aluminate.

2. A method of producing a beta-alumina ceramic article containing a doping addition of magnesium oxide, or magnesium oxide and lithium oxide, comprises the steps of wet-milling a precursor material or emulsification of an already powdered precursor material to form an aqueous slurry, spray-drying the slurry to produce a powder, forming the powder into a green shape and sintering the shape, and wherein the precursor material contains at least some of the magnesium oxide in the form of magnesium aluminate.

3. A method as claimed in claim 1 wherein all the magnesium oxide is in the form of magnesium aluminate.

4. A method as claimed in claim 3 wherein the precursor material comprises a mixture of magnesium aluminate together with alpha-alumina and sodium oxide or sodium aluminate or sodium hydroxide.

5. A method as claimed in claim 1 wherein lithium is included in the precursor material in the form of lithium oxide or lithium carbonate or lithium hydroxide or as lithium aluminate.

6. A method as claimed in claim 1 wherein the precursor material comprises sodium oxide or sodium hydroxide or sodium aluminate and a mixed magnesium lithium aluminate together with alpha-alumina.

7. A method as claimed in claim 1 wherein the spray-drying is effected using a stream of hot gas into which the slurry or the emulsion is fed and wherein the required powders are separated from the gas stream.

8. A method as claimed in claim 1 wherein the green shape is produced from the powdered material by isostatic pressing.

9. A method as claimed in claim 1 wherein the green shape is sintered by a rapid-sintering technique in which the green shape is moved continuously through a sintering furnace.

10. A method as claimed in claim 9 wherein the green shape is pre-fired at a temperature between 500° and 1000° C. for a period between 10 minutes and 10 hours before sintering.

11. A method as claimed in claim 9 wherein the pre-firing is carried out between 850° and 950° C. for a period of between 4 and 6 hours.

12. A method as claimed in claim 9 wherein the sintering is effected in a pass-through furnace at temperatures between 1550° and 1800° C. at a speed between 10 mm per minute and 100 mm per minute.

13. A method as claimed in claim 1 wherein the article is annealed after sintering at a temperature below the sintering temperature.

* * * * *